(12) United States Patent
Freeman et al.

(10) Patent No.: US 7,174,465 B2
(45) Date of Patent: Feb. 6, 2007

(54) SECURE METHOD FOR SYSTEM ATTRIBUTE MODIFICATION

(75) Inventors: Joseph Wayne Freeman, Raleigh, NC (US); Chad Lee Gettelfinger, Durham, NC (US); Steven Dale Goodman, Raleigh, NC (US); William Fred Keown, Jr., Raleigh, NC (US); Eric Richard Kern, Durham, NC (US); Randall Scott Springfield, Chapel Hill, NC (US)

(73) Assignee: Lenovo Singapore Pte, Ltd, Singapore (SG)

( * ) Notice: Subject to any disclaimer, the term of this patent is extended or adjusted under 35 U.S.C. 154(b) by 888 days.

(21) Appl. No.: 10/180,160

(22) Filed: Jun. 26, 2002

(65) Prior Publication Data

US 2004/0006700 A1 Jan. 8, 2004

(51) Int. Cl.
*H04L 9/32* (2006.01)
*H04L 9/00* (2006.01)

(52) U.S. Cl. .................... 713/191; 713/170

(58) Field of Classification Search ............... None
See application file for complete search history.

(56) References Cited

U.S. PATENT DOCUMENTS

| 5,276,884 | A | | 1/1994 | Mohan et al. | |
|---|---|---|---|---|---|
| 5,530,753 | A | | 6/1996 | Easter et al. | |
| 5,633,932 | A | * | 5/1997 | Davis et al. | 713/176 |
| 5,649,099 | A | | 7/1997 | Theimer et al. | |
| 5,715,448 | A | | 2/1998 | Suzuki et al. | |
| 5,768,389 | A | | 6/1998 | Ishii | |
| 5,982,899 | A | | 11/1999 | Probst | |
| 6,327,652 | B1 | | 12/2001 | England et al. | |
| 6,330,670 | B1 | | 12/2001 | England et al. | |
| 2002/0126850 | A1 | * | 9/2002 | Allen et al. | 380/277 |

OTHER PUBLICATIONS

Bruce Schneier. "Applied Cryptography". 1996. John Wiley & Sons, Inc. 2nd Edition. pp. 53-54.*
"Secure Authentication for Remote Client Management". Mar. 1, 1999. IBM. TDB-Acc-No: NNRD41993. vol. No. 42. Issue No. 419.*
Publication No. RD419093A. Feb. 20, 1999. IBM. Derwent-Acc-No: 1999-213300.*
TDB article, vol. 38, No. 04, Apr. 1995, J. McLean et al., pp. 407-410.
Research Disclosures, May 2000/943, pp. 943-945.

* cited by examiner

*Primary Examiner*—Ayaz Sheikh
*Assistant Examiner*—Saoussen Besrour
(74) *Attorney, Agent, or Firm*—Kunzler & Associates; Carlos Munoz-Bustamante

(57) ABSTRACT

A method is disclosed for securely updating system attributes of a client computer with a BIOS and includes signing a public key of a secure server with a private key of the BIOS prior to completion of manufacturing of the client computer to create an encrypted public key and embedded private key stored at the server. The method includes receiving at the server a request packet transmitted from the client computer requesting system attribute modification, encrypting the request packet to create an encrypted packet, and transmitting a return packet to client computer comprising the encrypted packet, the server's public key, and server instructions. The client computer decrypts the request packet using the server's public key and compares it to the original request packet, and if identical, executes the server instructions to modify the client computer's boot block to update client computer's system attributes.

20 Claims, 3 Drawing Sheets

SECURE METHOD FOR SYSTEM ATTRIBUTE MODIFICATION

BACKGROUND OF THE INVENTION

1. The Field of the Invention

The invention relates to the field of personal computer manufacturing, and more particularly to the ability to securely modify system attributes of a pre-configured computing device that has already completed the manufacturing process.

2. Background of the Art

Nearly every modern personal computer system is sold with Basic Input Output System (BIOS) code, but only recently have manufacturers of BIOS code provided mechanisms for enabling users of personal computers and manufacturers of personal computers to access BIOS code. BIOS is an embedded code storage application of the personal computer, and more particularly is a low level code interfacing the operating system to the specific hardware implementation. BIOS is typically stored in a flash Electrically-Erasable-Programmable-Read-Only-Memory (EEPROM) that in turn is mounted on the main system board of the personal computer. The BIOS of a main system board is often software stored on an EEPROM chip which helps the main system board to function correctly and communicate with devices on the board surfaces and also secondary devices and software protocols that are attached to or running on the main system board respectively.

Typical functions of the BIOS code include the initialization of disk drives (including floppy, hard, and compact), setting control registers settings and the initialization of the video and graphical interfaces. The BIOS is specifically configured for each PC based on the presence of specific hardware and the current version or manufacturer of the hardware to take advantage of all or select BIOS functions. Often, when the hardware of the personal computer is updated or modified, the BIOS code may need to be upgraded to properly recognize and initialize the new hardware. Typically, an updated BIOS can be flashed to the Flash Read-Only Memory (ROM), after additional components of the PC have been replaced or upgraded.

Additionally, it is known that the Flash ROM memory array may be divided into two distinct sections, the boot block and the main block. The main block of the Flash ROM contains applications, such as those presented above, which are hereinafter referred to as the "main data applications." The boot block of the Flash ROM is however protected from an ordinary flash, such that the data remaining in the boot block portion is present even after a corrupted Flash ROM image is flashed.

During the manufacturing process of personal computers, particularly of large volume orders, it is often typical for each ordered personal computer within a large order to be required to contain certain hardware capability, specific select software programs, and to be configured in a particular manner, per the order. In essence, a system is manufactured based upon a suite of features and capabilities (i.e., system attributes) for a specific customer or user. It is also quite common in these types of orders to include as a result of manufacture standardized or stock feature cards and/or chips that have functional capabilities beyond those functions or features initially ordered. Though the inclusion of such additional capabilities and functionality may appear to be more expensive, due to the quantity of stock product, the economics often favorably support such a manufacturing decision. This economic trade is becoming better understood in the industry, and is becoming a decision point that is resulting in manufacturers including a common set of features and equipment in most assembled products; this common set of equipment/functionality offering is also known as the manufacturer's "common building block."

However, for a variety of reasons, including specific customer requirements, it is often necessary to de-function or limit the capabilities of the additionally included functionality that is present on these cards and chips. Ensuring that this de-functioning result is maintained (such that the scope of system attributes as defined as of the time manufacture versus the broad capability available as a result of that present), and that such de-functioning survives post-manufacture is also an important issue as otherwise it may be possible for a user to order a "reduced-function" system at a reduced cost and perform unauthorized post-manufacturing modifications to illegally upgrade and sell a "full-function" system that does not meet the standards of the labeled manufacturer of the system. Similarly, there also may exist a situation where one or more manufactured system needs to be modified or upgraded (e.g., a customer has cancelled orders or there exists an oversupply of stock of a manufactured line in-house) such that further functionality of system attributes of those systems need to be either increased or decreased in functioning scope. Since manufacturing of systems often occurs at locations separate from order facilities and by vendors who are contracted to manufacture, ensuring that end products produced are commensurate with the prescribed system attributes assigned at the time of manufacture is important but is clearly difficult to track.

Fixing a set of system attributes for a system at a particular time or stage of manufacture is however possible using the boot block. For instance, when a system has completed the manufacturing stage (i.e., the system has not yet been shipped to the customer but has been built to a prescribed level of manufacture), it is possible to concurrently set a bit (e.g., MFG_DONE) within the boot block of the system in the manufacturing environment to indicate that the system is complete (or at a particular stage) and that no further system attribute changes or modifications are to take place. In other words, the system has a fixed set of system attributes. Although the MFG_DONE bit is identified herein by example, other one-way bits located in the boot block are also envisioned by the present invention, and the invention is not so limited to the examples set forth.

The MFG_DONE bit is a bit that may be set by the manufacturer at the time of completion of the system (or at a predetermined stage of manufacture), and the setting of the bit prevents further modification to the set of system attributes of that particular system outside of the manufacturing environment. This bit setting approach in the manufacturing environment is an approach that is well-aligned with requirements set forth by the Trusted Computer Platform Alliance (TCPA) requiring that a manufacturer establish a Core Root of Trust for Measurement (CRTM) that is to be controlled by manufacturing. One of the goals of the TCPA is to maintain the privacy of the platform owner while providing a ubiquitous interoperable mechanism to validate the identity and integrity of a computing platform. However, since the MFG_DONE bit is set in the manufacturing environment, in the event the finished system is recalled, withdrawn, identified as overstock to be modified, selected for re-introduction, or the like, or when there is an express order to alter its functionality, the system attributes of that system cannot be easily changed since the MFG_DONE bit is set to indicate that the system is "outside of the manufacturing environment." Similarly, there may exist the situation where a large volume system user orders an upgrade of the functions and features of numerous systems that were originally ordered as "low-function" to "full-function" and are presently in operation at the client site, which is physically remote from the manufacturing environment.

As used herein the terms "BIOS", "BIOS code", "BIOS image files" and "system BIOS" are used interchangeably and are intended to have similar meanings and uses in relation to functions and characteristics associated with BIOS. As used herein the terms "personal computer," "computer," "PC," "system," "computing device," and "server," are used interchangeably and are intended to have similar meanings and uses in relation to functions and characteristics associated with electronic information handling systems.

SUMMARY OF THE INVENTION

Therefore, what is needed is a method that allows for secure and limited access to a completed system so as to modify the system attributes of the completed system as though the system were in the manufacturing environment by accessing the identifying bit of the boot block to allow system attributes to be modified, even when the system is physically outside of or has already left the manufacturing environment.

One embodiment of the present invention is directed to a method for securely updating one or more system attributes of a client computer having a BIOS, comprising the steps of signing a public key of a secure server with a private key of the BIOS of the client computer prior to manufacturing completion of the client computer. Once signed, an encrypted public key and an embedded private key is created and stored at said server. When the system attributes of a completed system are to be modified, the client computer transmits a transmitted request packet requesting system attribute modification to the server, and the server upon receipt of the packet, encrypts the received request packet with the server's private key to create an encrypted packet. The server then may transmit a return packet to the requesting client computer wherein the return packet comprises the encrypted packet, the server's public key, and the server instructions regarding a command sequence to update the system attributes. The client computer receives the return packet and decrypts the server's public key and compares the return packet with the request packet originally transmitted for equivalency, If the two packets are equivalent, the client computer executes the transmitted server instructions at the client computer so as to modify the client computer's boot block and thereby update the client computer's system attributes.

In another embodiment, the present invention is directed to a secure method for remotely updating one or more system attributes of one or more client computers from a client computer site, comprising the steps of signing a public key of a secure server with a private key of the BIOS of the one or more client computers prior to manufacturing completion of the one or more client computers. Once at the client site, a single client computer of the one or more client computers is identified to facilitate initial and terminal communication between the manufacturing server and the one or more client computers. The identified single client computer initiates a secure communication session between the manufacturing server and the single client computer. The manufacturing server receives the transmitted request packet from the one or more client computers requesting a specific system attribute modification for each of the one or more client computers, respectively. Each received request packet at the secure server is encrypted with a server private key to create an encrypted packet for each of the one or more client computers, respectively. A unique return packet is then transmitted to each of the one or more client computers, respectively, such that the unique return packet comprises the encrypted packet, the server public key, and the server instructions. Preferably, the server instructions include commands related to system attribute modifications for the specific client computer. At each of the one or more client computers, respectively, the server public key is decrypted and the unique return packet and the transmitted request packet are compared for equivalency. If equivalent, the server instructions are executed so as to modify each of the one or more client computers' boot block to update each of the one or more client computers' system attributes. Once all client computers to be modified have communicated with the manufacturing server, the session is terminated between the manufacturing server and the single client computer.

In a further embodiment, the present invention is directed to a method for a retail environment having one or more client computers to securely update the one or more client computers to reflect current customer system configuration interests.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION OF THE PREFERRED EMBODIMENTS

Figure 1:
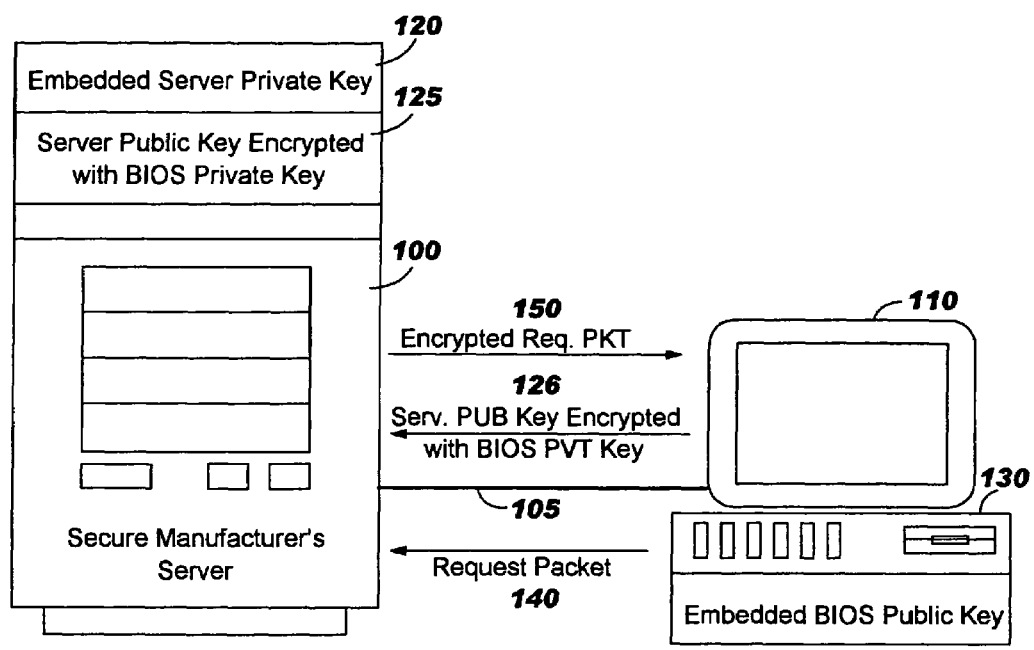
FIG. 1 is a diagram of a secure manufacturing server and a secure client in a preferred embodiment of the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

FIG. 1 is a diagram of a secure manufacturing server and a secure client in a preferred embodiment of the present invention. From FIG. 1, the secure manufacturing server (100) is shown in communication via a communication link (105) with a client computer (110). For exemplary purposes, as will be evident in the discussion following, FIG. 1 is demonstrative in depicting the presence of the embedded server private key (120), the server public key encrypted with BIOS private key (125) and the client's embedded BIOS public key (130). From FIG. 1 it is possible to better understand the communications between a manufacturing server (100) and one or more client computers (110) according to preferred embodiments of the present invention.

In a preferred embodiment of the present invention, the manufacture's public key of the manufacturer's server (Manufacture Sever Public Key) is encrypted with the manufactured computer's BIOS private key (Client BIOS Private Key). The secure manufacturing server will store the resulting encryption (125). Upon the event when one or more client computers (110) requests a modification to their respective system attributes, the client computer issues a request packet (140) to the secure manufacturing server. By example, the request packet issued may be a secure random number generated or the like, and is preferably a NONCE. As used herein, the term NONCE, is a parameter that varies with time, such as a time stamp, a special marker, or a unique random number specific to the message generated, for instance.

Once received at the secure manufacturing server (100), the request packet is encrypted at the secure manufacturing server (100) using the embedded server private key (120). The secure manufacturing server (100) then transmits the encrypted request packet (150) along with the resulting encryption (Server Public Key Encrypted with BIOS Private Key (125)) at 126 to the client computer initiating the request (110). Preferably the encrypted request packet also comprises server instructions for execution upon decryption related to system attribute modifications of the client computer (110).

Upon receipt of 150 and 126, the client computer (110) decrypts the Server Public Key Encrypted with BIOS Private Key portion with the embedded BIOS Public Key (130), and stores the decrypted Server Public Key portion of 126 locally at the client computer (110). The client computer (110) then uses the stored and decrypted Server Public Key portion to decrypt the encrypted request packet (150) received from the secure manufacturing server (100). Once decrypted, the client computer (110) compares the NONCE, or similar, to determine if the received encrypted request packet (150) is an authentic request packet.

Upon favorable comparison, such that the client computer (110) determines that the received encrypted request packet (150) is an authentic request packet, the server instructions, if any, are executed and a sequence to initiate system attribute modification for the client computer (110) is initiated.

Figure 2:
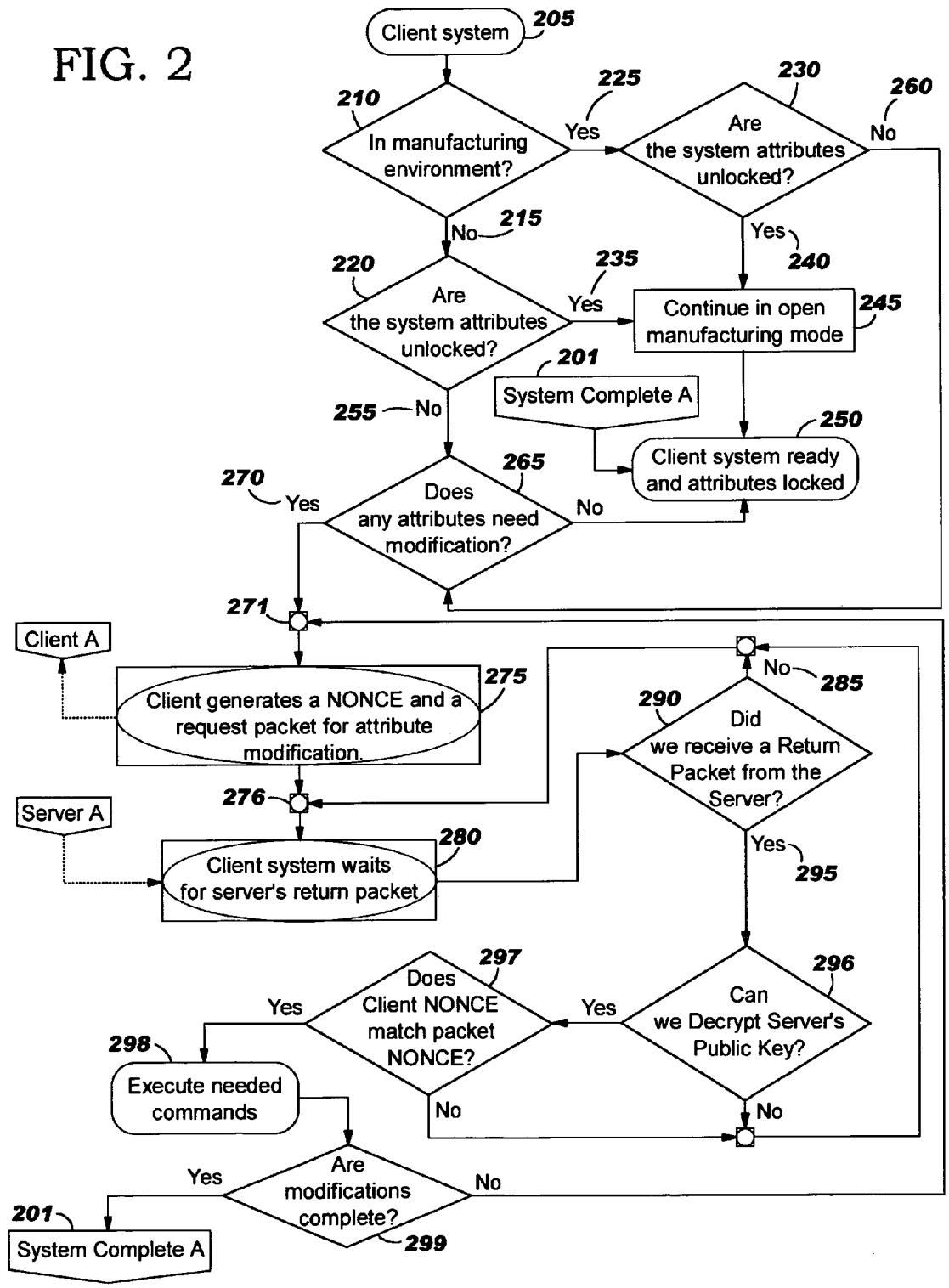
FIG. 2 is a diagram of a secure client operation in a preferred embodiment of the present invention.

FIG. 2 is a diagram of a secure client operation in a preferred embodiment of the present invention. From FIG. 2 it is possible to better understand the communications from and activities of the client computer according to a preferred embodiment of the present invention.

In a preferred embodiment of the present invention, a client computer (205) is identified as being in the manufacturing process. An assessment is performed at the client computer (205) to determine the status of a predetermined boot block bit, such as MFG_DONE, at 210. If the predetermined boot block bit is set to indicate that the manufacturing is complete (215), the system attributes are then evaluated to determine if the attributes are locked or unlocked, at 220. If the predetermined boot block bit is set to indicate that the manufacturing is not complete (225), such that the system remains in the manufacturing environment, the system attributes are then evaluated to determine if the attributes are locked or unlocked, at 230.

For either event, if the system attributes are determined to be unlocked, at 235 and 240, respectively, modifications to the system attributes may continue as the client computer (205) remains in the manufacturing environment (245). However, once the client computer (205) is deemed to be completed, the system is identified as being "ready" for release and the system attributes are locked (i.e., fixed), at a predetermined point in the manufacturing process, by setting the boot bit indicator (250).

In the event that the system attributes are determined to be locked, at 255 and 260, respectively, modifications to the system attributes may not be performed as the client computer (205) is deemed to be out of the manufacturing environment and is completed. A further event may occur where the identified client computer (205) is assessed as to its present system attributes (265). If it is determined that system attributes require modification (270), the client computer issues request packet (275) preferably comprising a generated NONCE to be sent to the secure manufacturing server (not pictured). If it is determined that no further modification is needed, the client computer is deemed to be complete.

Figure 3:
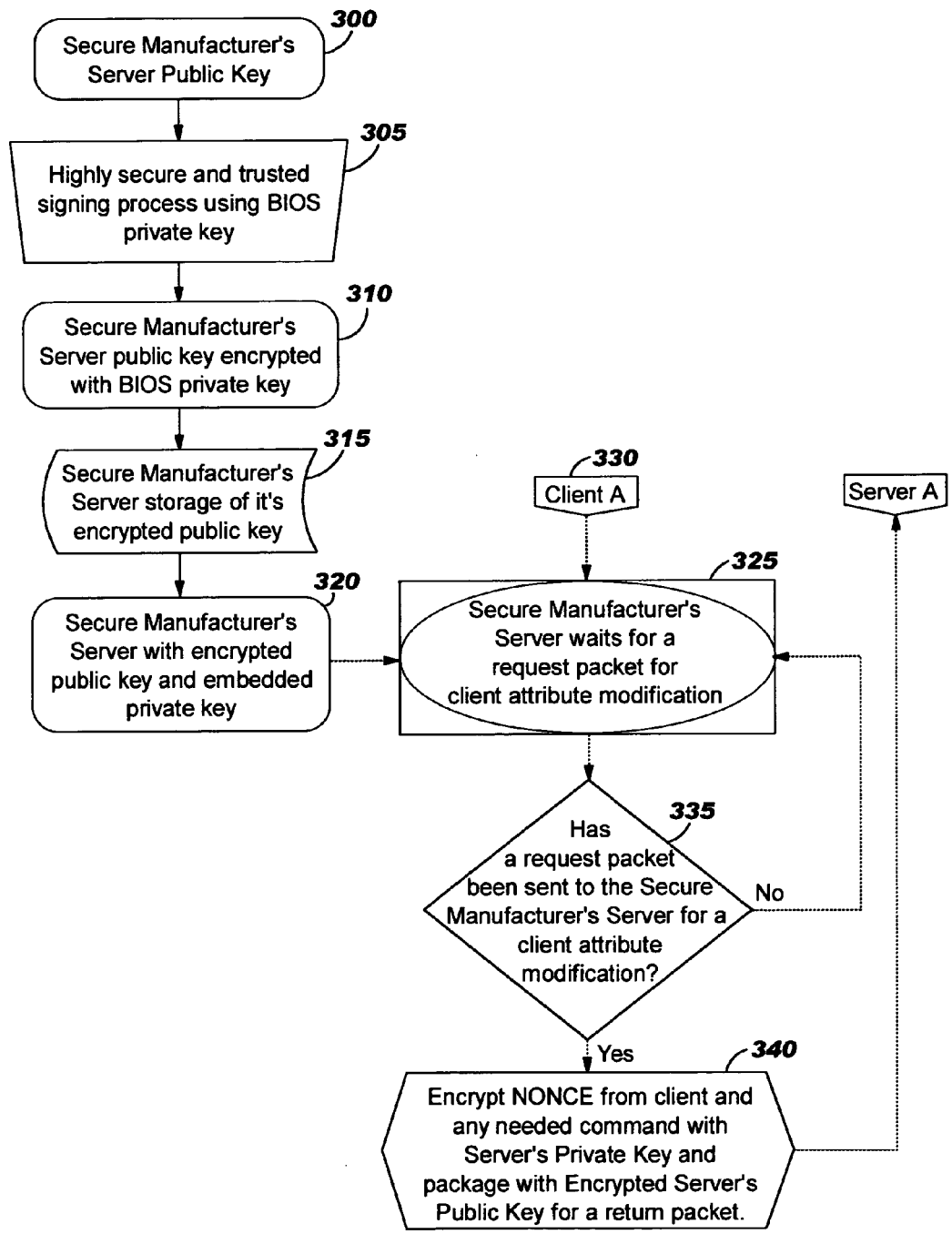
FIG. 3 is a block diagram of a secure manufacturing server operation in a preferred embodiment of the present invention.

Upon the issuance of the request packet by the client computer at 275, the client waits for a response from the secure manufacturing server at 280, which is described in detail with regard to FIG. 3. If a response is not received from the secure manufacturing server, the client computer may continue to wait until a system administrator overrides the request or the request is timed out (285). During the wait, a wait for a response is assessed (290), and once a response is received from the secure manufacturing server (295), a decryption event is initiated. Upon receipt of an encrypted response, the client computer assesses whether it is able to decrypt the public key of the secure manufacturing server at 296. Typically, the response received is a packet from the secure manufacturing server that includes the NONCE, supplements of command information from the server, if any, along with a secure manufacturing server private key. The response received is also preferably encrypted with the secure manufacturing server public key.

If the client computer is able to successfully decrypt the public key of the secure manufacturing server, the client computer then compares the NONCE of the encrypted request packet with the NONCE issued by the client, at 297. If the comparison of the NONCEs by the client computer is successful, the client computer executes the commands contained in the received encrypted request file from the secure manufacturing server, at 298 and updates the system attributes. Once updated, if the update is deemed complete at 299, the client computer is deemed complete at 201 and the system attributes are locked at 250.

For the above event, if the client computer is not able to decrypt the public key of the secure manufacturing server or identifies that the NONCEs are not equivalent, the client computer may wait at 276 for another encrypted return packet from the server or the session may be timed out or cancelled. If it is determined at 299 that system attribute modifications are not complete, the client computer may generate a further request at 271. FIG. 3 is a block diagram of a secure manufacturing server operation in a preferred embodiment of the present invention. From FIG. 3 it is possible to better understand the communications from and activities of the secure manufacturing server according to a preferred embodiment of the present invention.

In a preferred embodiment of the present invention, a secure manufacturing server (300) having a server public key of the manufacturer is identified. Using a secure process at 305, an encrypted signing occurs between the server public key of the manufacturer at the server and the BIOS private key of the client computer at 310. The secure manufacturing server stores the resulting encrypted public key at 315. At the secure manufacturing server, the encrypted public key and the embedded private key are identified at 320. Upon the receipt of a request by a client computer (identified as Client A at 330) to modify system attributes, at 325, the secure manufacturing server verifies that the request packet is authentic at 335. If the request packet received is not authentic, the server may continue to wait or may send a notice that the packet is void. If the request packet is authenticated, the secure manufacturing server encrypts the NONCE therein and supplements with command information, if any, along with secure manufacturing server public key. The secure manufacturing server then encrypts the return request with secure manufacturing server private key for a return packet sent to client computer at 340.

The present invention also has other possibilities such as using the methods for secure access in military applications, manufacturing environments and retail space sectors, without limitation. It is evident that the invention is suitable for use under these and other circumstances, as system attributes may often require updating or modification in a variety of locations and markets, wherever computers exist. It is also evident that the present invention could be implemented in other manners and by other methods.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for securely updating one or more system attributes of a completely manufactured client computer having BIOS, comprising the steps of:

signing a public key of a secure server with a private key of said BIOS prior to completion of manufacturing the client computer to create an encrypted public key of the secure server and an embedded private key of the BIOS, the encrypted public key and embedded private key stored at the secure server, receiving at the secure server a request packet transmitted from the client computer, the requested packet comprising requesting system attribute modification for the client computer, encrypting the received request packet at the secure server using a private key of the secure server to create an encrypted packet, transmitting a return packet to the client computer, the return packet comprising the encrypted packet, the server's public key, and server instructions, decrypting the encrypted public key of the secure server at the client computer, decrypting the encrypted packet using the server's public key at the client computer, comparing the request packet of the return packet with a copy of the request packet transmitted to the secure server, and executing the server instructions at the client computer in response to the request packet of the return packet and the copy of the request packet transmitted to the secure server being identical, wherein executing the server instructions modifies the client computer's boot block to update the client computer's system attributes.

2. The method of claim 1, wherein the request packet comprises a NONCE.

3. The method of claim 1, wherein the encrypted packet comprises a NONCE.

4. The method of claim 1, wherein the client computer is outside of a manufacturing environment.

5. The method of claim 4, wherein a one-way boot bit of said client computer is fixed to indicate that the client computer is outside of the manufacturing environment.

6. A secure method for remotely updating one or more system attributes of one or more client computers from a client computer site, comprising the steps of:

signing a public key of a manufacturing server with a private key of each BIOS of the one or more client computers prior to manufacture completion of each client computer to create an encrypted public key of the manufacturing server and an embedded private key of the BIOS of each client computer, the encrypted public key and private key of the BIOS of each client computer stored at the manufacturing server, identifying a single client computer of the one or more client computers to facilitate initial and terminal communication between the manufacturing server and the one or more client computers, initiating a secure communication session between the manufacturing server and the single client computer, receiving at the manufacturing server a request packet transmitted from at least one of the one or more client computers, each request packet comprising requesting a specific system attribute modification for the client computer requesting modification, encrypting each received request packet at the secure server using a private key of the manufacturing server to create an encrypted packet for each client computer requesting modification, transmitting a unique packet to each of the computers requesting modification, each return packet comprising the encrypted packet of the client computer requesting modification, the server public key, and server instructions for the client requesting modification, decrypting the manufacturing server public key at each of the one or more client computers requesting modification, decrypting the encrypted packet using the manufacturing server public key at each of the one or more client computers requesting modification, comparing for each of the one or more client computers requesting modification the request packet of the unique return packet and a copy of the request packet transmitted to the manufacturing server, executing the server instructions for each client computer requesting modification, in response to the request packet of the return packet and the copy of the request packet transmitted to the manufacturing server being identical, wherein executing the server instructions modifies the client computer's boot block to update the client computer's system attributes, and terminating the secure communication session between the manufacturing server and the single client computer.

7. The method of claim 6, wherein the manufacturing server is physically located at a location different than the client site.

8. The method of claim 6, wherein the server instructions identify commands to be executed to modify system attributes for the one or more client computers, respectively.

9. The method of claim 6, wherein the single client computer communicates the extent of the session with the manufacturing server including details of the number of client computers to be modified.

10. The method of claim 6, wherein the single client computer monitors the security of the communication link between the manufacturing server and the one or more client computers.

11. The method of claim 6, wherein a one-way boot bit of the client computer indicates that said client computer is outside of a manufacturing environment.

12. The method of claim 11, wherein the boot bit is MFG_DONE.

13. The method for retail environment having one or more client computers to securely update the one or more client computers to reflect current customer system configuration interests, comprising the steps of:

signing a public key of a secure server with a private key of BIOS of said one or more client computers prior to completion of manufacturing of the one or more client computers to create an encrypted public key of the secure server and an embedded private key of the BIOS, the encrypted public key and embedded private key stored at the secure server for each of the one or more client computers, identifying one or more client computers in a retail environment to be updated, receiving at the secure server a request packet transmitted from each of the identified client computers, the request packet comprising requesting system attribute modification for the one or more identified client computers, encrypting the received request packets at the secure server using a private key of the secure server to create an encrypted packet for each request packet of the one or more identified client computers, transmitting a return packet to each of the identified client computers, the return packet comprising the encrypted packet corresponding to the client computer that the return packet is transmitted, the server's public key, and server instructions, decrypting, at each of the one or more identified client computers, the server's public key, decrypting, at each of the one or more identified client computers, the encrypted packet using the server's public key, comparing, at each of the one or more identified client computers, the request packet of the return packet and a copy of the request packet transmitted to the secure server, and executing the server instructions for each identified client computer in response to the request packet of the return packet and the copy of the request packet transmitted to the secure server of a client computer being identical wherein executing the server instructions modifies the client computer's boot block to update the client computer's system attributes.

14. The method of claim 13, wherein the request packet comprises a NONCE.

15. The method of claim 13, wherein the encrypted packet comprises a NONCE.

16. The method of claim 13, wherein the client computer is outside of a manufacturing environment.

17. The method of claim 13, wherein the retail environment is a computer retail store.

18. The method of claim 13, wherein the retail environment is a warehouse.

19. The method of claim 13, wherein a one-way boot bit of the client computer indicates that the client computer is outside of a manufacturing environment.

20. The method of claim 19, wherein the boot bit is MFG_DONE.

* * * * *